UNITED STATES PATENT OFFICE.

ARTHUR WILLIAM FISHER, OF PULTNEYVILLE, NEW YORK.

COMPOSITION OF MATTER.

1,247,522.  Specification of Letters Patent.  Patented Nov. 20, 1917.

No Drawing.  Application filed October 5, 1914.  Serial No. 365,012.

*To all whom it may concern:*

Be it known that I, ARTHUR WILLIAM FISHER, a citizen of the United States, residing at Pultneyville, in the county of Wayne and State of New York, have invented a new and useful composition of matter adapted to be used as an aid in the detection, isolation, or identification of the germs of typhoid or paratyphoid fever in absorbable or secreted fluids, in sewage, or in decayed matter, of which the following is a specification.

My composition consists of the following ingredients, combined in the proportion stated, viz:

Nutrient broth, 1000 cubic centimeters;
Agar-agar, 30 grams;
Litmus solution, from 120 to 150 cubic centimeters;
Malachite green, 17 cubic centimeters of a one per cent. solution;
Crystal violet, aqueous solution of, 10 cubic centimeters of a one-tenth per cent. solution.

The above represents the best relative proportions of the particular samples of the ingredients I am using at present; other samples, particularly of crystal violet and malachite green, must have their proportions determined according to their combining power and adaptability, which vary widely with the different commercial grades of these materials. The range of proportions of the various ingredients for one liter of broth, for example, has been found to be: agar-agar, 10 to 50 grams; litmus solution, 50 to 300 cc.; crystal violet, 5 to 40 cc. of a one-tenth per cent. solution; malachite green, 10 to 80 cc. of a one per cent. solution.

The nutrient broth is to be, preferably, sugar-free beef broth alkaline to litmus to the extent of about 4 cubic centimeters normal sodium carbonate beyond the neutral point. If beef broth in sufficient quantity is still deficient in nutrition, an additional nutrient, such as nutrose or glycerin—either or both—to the amount of 5 to 10 grams of the former or 50 cc. of the latter, may be employed or added.

The agar-agar should be finely divided, melted, well filtered, and clarified.

The litmus solution may be substituted by any kind of indicator in sufficient quantity to show reaction produced by germs. Lactose or milk sugar, to the amount of 6 to 8 grams, may be used in connection with the indicator.

The crystal violet and the malachite green (the latter is also often termed benzaldehyde green) may be used in any suitable proportion or relation either before or after these ingredients, or their resultant products, enter the medium. These ingredients are derivatives of triphenylmethane and are both basic colors. Crystal violet is a triamino derivative of triphenylmethane, and malachite green is a diamino derivative of triphenylmethane.

Tubing, putting about 8 cubic centimeters in each sterile test tube. The sterilization may be fractional or discontinued.

In compounding the medium I mix the solutions of crystal violet and malachite green in suitable proportions, allow time for reaction, add them directly to the medium and mix the whole thoroughly. In the majority of cases the best proportion is 1 cc. of crystal violet with 16 to 20 cc. (usually 17 cc.) of malachite green; that is to say, 10 cc. of a one-tenth per cent. solution of crystal violet and 16 to 20 cc. of a one per cent. solution of malachite green, or the equivalent of these. These solutions are aqueous and should be freshly and accurately made for each medium, as they tend to deteriorate. I therefore take 10 cc. of a one-tenth per cent. aqueous solution of crystal violet and mix it with 16 to 20 cc. (preferably 17 cc.) of a one per cent. solution of malachite green and allow it to stand for one or two hours and heat it just a little in the water bath before adding it to the medium, mix thoroughly and tube the medium at once, putting about 8 cc. in the test tube. I sterilize by fractional or discontinued sterilization for 30 minutes immediately after tubing, 20 minutes 24 hours later, and 15 minutes after the next 24 hours, and store the medium in a cold, moist place. (N. B. The autoclave should not be used for sterilizing, as it usually spoils the medium entirely.)

A compound consisting of crystal violet and malachite green, mixed in certain proportions and used in a certain way, will be made the subject of a separate application. In the present use of these ingredients, the medium compounded as described gives best results after it has been made at least a week. It is best to learn the characteristics of the typhoid colony as they are manifested in this medium by studying known typhoid or paratyphoid colonies under various circumstances as they appear in the medium from day to day. It is also best to use two or three Petri dishes so as to check results. I always aim to get not more than one hundred colonies in each dish.

In preparing the medium for inoculation, I place the tubes of the medium in a ring stand in the water bath with sufficient water to cover the medium and boil until the latter is entirely melted, but not longer—three minutes is about the limit. I then cool down the water bath to about 60 degrees C. and allow it to cool gradually to about 47 degrees C. and roll the dish well so as to distribute the germs evenly. (Note: care should be taken not to pour any sediment from the bottom of the test tube into the Petri dish, as sediment interferes greatly with the microscopic work.) The medium of the present invention may be inoculated the same as any other agar-agar media.

After the medium described has been cooled down to about 47 degrees centigrade, it is ready for inoculation. Inoculation is made according to the material to be tested, its condition, and the results aimed at. In general, inoculation of this medium is made as in any other agar-agar medium. The medium of the present invention is designed to be used chiefly for testing water, to find out as nearly as possible the number of typhoid or paratyphoid germs present in the water. One of the ways of using this medium is to put the desired amount of suspected water into a sterile Petri dish by means of a graduated sterile pipette inserted under the raised cover of the dish, and then the mouth of the tube containing cooled medium is similarly inserted and the medium poured into and quickly mixed with the water and spread by tilting the dish and rolling it gently. The dish is then placed on a level surface until the medium is solidified and the germs contained therein become incubated.

To facilitate the counting of the germs contained in the water the suspected water may be poured into the tube containing the cooled medium. The tube is to be held vertically in the hand and whirled until the water is thoroughly and evenly mixed in the medium. The mixture is then poured out and distributed as described. This method gives an even distribution of the germs and thus facilitates their counting and isolating.

The inoculation of fluids other than water is made precisely the same way after proper dilutions have been made. A microscopic examination of a drop of the suspected fluid gives a fair idea of the amount of dilution necessary. With the exact amount of dilution known the number of germs present in the original fluid is readily ascertained. A series of dilutions may be made up to any number. These dilutions are to be made by means of sterile dishes and sterile graduated pipettes, ascending from the lower dilutions to the higher. In this way milk, blood, sewage, and other fluids may be tested.

The typhoid and paratyphoid colonies in this medium are peculiar to themselves and different from all others. The medium of the present invention tends to sift out germs from all others growing in the fluid which is being tested. Plain media, such as gelatin or agar-agar and those not containing inhibitive ingredients, will show the whole number of germs in the fluid tested; while a medium like the Drigalski-Conradi will show the number of colon and other acid-forming germs present, because they ferment the milk sugar in that medium, and the colonies appear red, for the litmus of the medium shows the presence of the acid they form. Typhoid and paratyphoid germs are chiefly alkaline in reaction and ferment milk sugar but feebly, and then only after a considerable period had elapsed. These colonies do not therefore turn red like the colon on the Drigalski-Conradi medium and are not characteristic enough to enable the observer to distinguish them readily from other small colonies growing in the same medium. The present medium increases the size of the typhoid and paratyphoid colonies by proper nutrients in the medium, which helps materially to distinguish them from others; the typhoid and paratyphoid colonies take on a peculiar characteristic color scheme, forming concentric rings or bands of different colors.

While media containing several of the ingredients herein described have been used before, no medium has, to my knowledge, ever been produced into which crystal violet and malachite green entered either before or after introduction into a medium adapted to be used as an aid in the detection, isolation, or identification of the germs of typhoid or of paratyphoid fevers in fluids or solids.

Having described my invention and reserving the right to make such alterations and changes in the compounding of the same as fairly fall within the spirit and scope of my invention, I claim:

1. A composition of matter for use as an aid in the detection, isolation or identification of the germs of typhoid or paratyphoid fever comprising crystal violet 5 to 40 cubic centimeters and malachite green 10 to 80 cubic centimeters to a predetermined quantity of agar-agar medium, as one liter.

2. A composition of matter comprising a solution of crystal violet and malachite green, mixed in suitable proportions, in combination with 10 to 50 grams of agar-agar to a predetermined quantity of nutrient broth, as one liter.

3. A composition of matter consisting, as herein described, of a suitable quantity of the resultant product of crystal violet and malachite green, mixed in the proper proportion of their combining power, and added to an agar-agar medium comprising about one liter of nutrient broth and 50 to 300 centimeter of litmus solution, or equivalent indicator in sufficient quantity to show reaction produced by germs.

4. A composition of matter comprising nutrient broth about one liter, agar-agar 10 to 50 grams, an indicator in sufficient quantity to show reaction produced by germs, and a solution of crystal violet and malachite green mixed in suitable proportions, as set forth and described.

5. The herein described composition of matter consisting of nutrient broth 1000 cubic centimeters, agar-agar 30 grams, litmus solution from 120 to 150 cubic centimeters, crystal violet 10 cubic centimeters of a one-tenth per cent. solution, and malachite green 17 cubic centimeters of a one per cent. solution, substantially as described.

In testimony whereof I have signed my name to this specification in the presence of two subscribing witnesses this 30th day of September, 1914.

ARTHUR WILLIAM FISHER.

Witnesses:
  HARRY FISHER,
  HOWARD E. COLBY.